(12) United States Patent
Raavi et al.

(10) Patent No.: US 11,514,016 B2
(45) Date of Patent: Nov. 29, 2022

(54) PAGING ROW-BASED DATA STORED AS OBJECTS

(71) Applicant: International Business Machines Corporation, Armonk, NY (US)

(72) Inventors: Raghuveer Raavi, Durham, NC (US); Joshua S. Allen, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 16/743,217

(22) Filed: Jan. 15, 2020

(65) Prior Publication Data
US 2021/0216518 A1 Jul. 15, 2021

(51) Int. Cl.
*G06F 16/22* (2019.01)
*G06F 16/28* (2019.01)

(52) U.S. Cl.
CPC ...... *G06F 16/2272* (2019.01); *G06F 16/2282* (2019.01); *G06F 16/289* (2019.01)

(58) Field of Classification Search
CPC . G06F 16/2272; G06F 16/2282; G06F 16/289
See application file for complete search history.

(56) References Cited

U.S. PATENT DOCUMENTS

| | | | |
|---|---|---|---|
| 10,089,338 B2 | 10/2018 | Ji et al. | |
| 10,248,682 B2 | 4/2019 | Regni et al. | |
| 10,254,980 B1 | 4/2019 | Patel | |
| 2003/0182292 A1* | 9/2003 | Leong | G06F 16/2228 |
| 2007/0208773 A1* | 9/2007 | Tsao | G06F 8/71 |
| 2009/0288026 A1* | 11/2009 | Barabas | G06F 16/10 715/764 |
| 2015/0134699 A1* | 5/2015 | Bhide | G06F 16/2272 707/781 |
| 2018/0203865 A1* | 7/2018 | Srinivasan | H04L 9/3247 |
| 2019/0065545 A1 | 2/2019 | Hazel et al. | |
| 2019/0079991 A1* | 3/2019 | Gao | G06F 16/137 |

OTHER PUBLICATIONS

Gibson, "Accessing and Paginating CSV Files with DataValve", Andy Gibson, Open Source Projects & Technical Writings, printed Nov. 26, 2019, 11 pages. http://www.andygibson.net/blog/tutorial/accessing-and-paginating-csv-files-with-datavalve/.

(Continued)

*Primary Examiner* — Grace Park
(74) *Attorney, Agent, or Firm* — Daniel M. Yeates (57) ABSTRACT

A computer-implemented method for paging row-based data stored as an object file. The method includes receiving, from a client, a request for a set of data, wherein the set of data is included in a file, the file is stored as an object file, and the object file is stored in an object based storage system and the file includes row based data for a plurality of rows. The method also includes, generating, by a micro-service, an index of the file, wherein the index file includes a byte to row translation of a portion of the file. The method includes, storing the index in the object based storage system. The method further includes, retrieving, from the index, the set of data. The method includes, returning, to the client, the set of data.

19 Claims, 6 Drawing Sheets

(56) References Cited

OTHER PUBLICATIONS

Heuvel, "Streaming large CSV files with Laravel chunked queries", Medium, Sep. 19, 2015, 3 pages. https://medium.com/@barryvdh/streaming-large-csv-files-with-laravel-chunked-queries-4158e484a5a2.

"Pagination required to limit my csv file result on my PHP Page", Stack Overflow, printed Nov. 26, 2019, 1 page. https://stackoverflow.com/questions/22032141/pagination-required-to-limit-my-csv-file-result-on-my-php-page.

Bethea, "How to Display a CSV File on a Web Page", Chron, Small Business, printed Nov. 26, 2019, 4 pages. https://smallbusiness.chron.com/display-csv-file-47177.html.

"How to read only n rows of large CSV file on HDFS using spark-csv package?", Stack Overflow, printed Jan. 15, 2020, 1 page. https://stackoverflow.com/questions/44277019/how-to-read-only-n-rows-of-large-csv-file-on-hdfs-using-spark-csv-package.

Mell et al., "The NIST Definition of Cloud Computing", Recommendations of the National Institute of Standards and Technology, Special Publication 800-145, Sep. 2011, 7 pages.

\* cited by examiner

PAGING ROW-BASED DATA STORED AS OBJECTS

BACKGROUND

The present disclosure relates to paging data, and, more specifically, paging row-based object data.

User interfaces often have a requirement to show only a portion of a large file at a single time. For row-based data, many systems require the data to be stored or converted into a database format. Databases generally store each row as individually accessible and indexable records. However, it is not always ideal to use a database to store row-based data.

SUMMARY

Disclosed is a computer-implemented method for paging row-based data stored as an object file. The method includes receiving, from a client, a request for a set of data, wherein the set of data is included in a file, the file is stored as an object file, and the object file is stored in an object based storage system and the file includes row based data for a plurality of rows. The method also includes, generating, by a micro-service, an index of the file, wherein the index file includes a byte to row translation of a portion of the file. The method includes, storing the index in the object based storage system. The method further includes, retrieving, from the index, the set of data. The method includes, returning, to the client, the set of data. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

User interfaces often have a requirement to show only a portion of a large file at a single time. For row-based data, many systems require the data to be stored as or converted into a database format. Databases generally store each row as individually accessible and indexable records. However, it is not always ideal to use a database to store row-based data. Object storage has become a useful way to store large files of row-based data.

In order to better manage object data, and limit the use of bandwidth and computing resources, embodiments of the present disclosure can display a portion of a large object file that includes row-based data.

The following acronyms may be used below:
API application program interface
ARM advanced RISC machine
CD-ROM compact disc ROM
CMS content management system
CoD capacity on demand
CPU central processing unit
CUoD capacity upgrade on demand
DPS data processing system
DVD digital versatile disk
EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network
LPAR logical partition
PaaS platform as a service
PDA personal digital assistant
PLA programmable logic arrays
RAM random access memory
RISC reduced instruction set computer
ROM read-only memory
SaaS software as a service
SLA service level agreement
SRAM static random-access memory
WAN wide-area network Cloud Computing in General It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
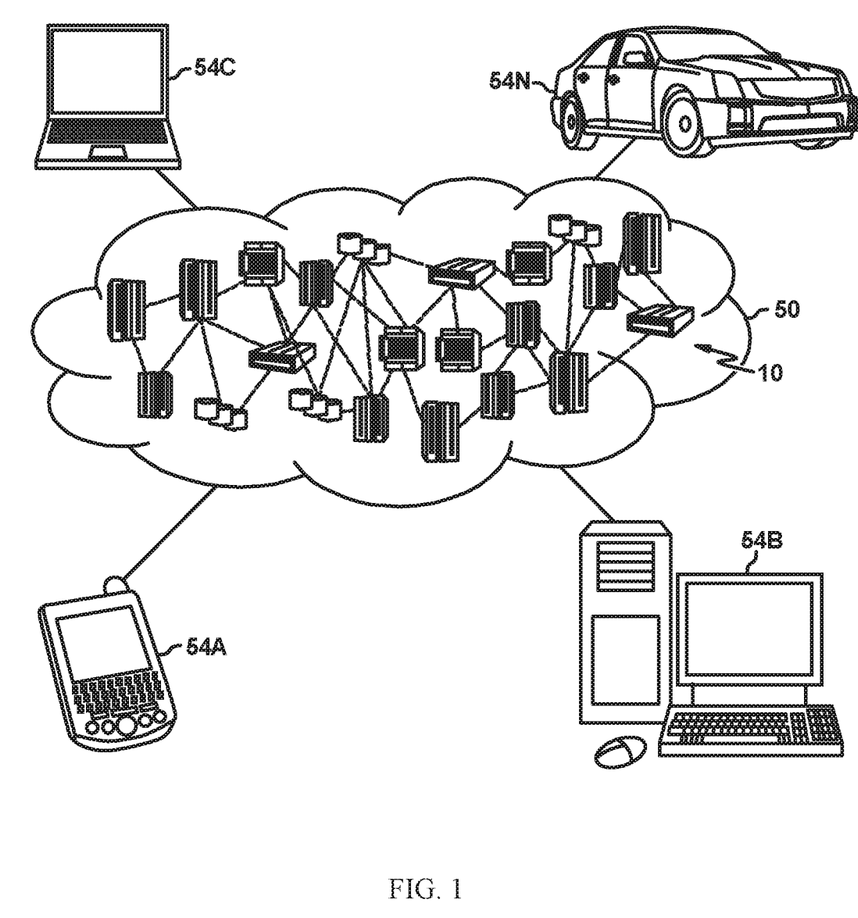
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
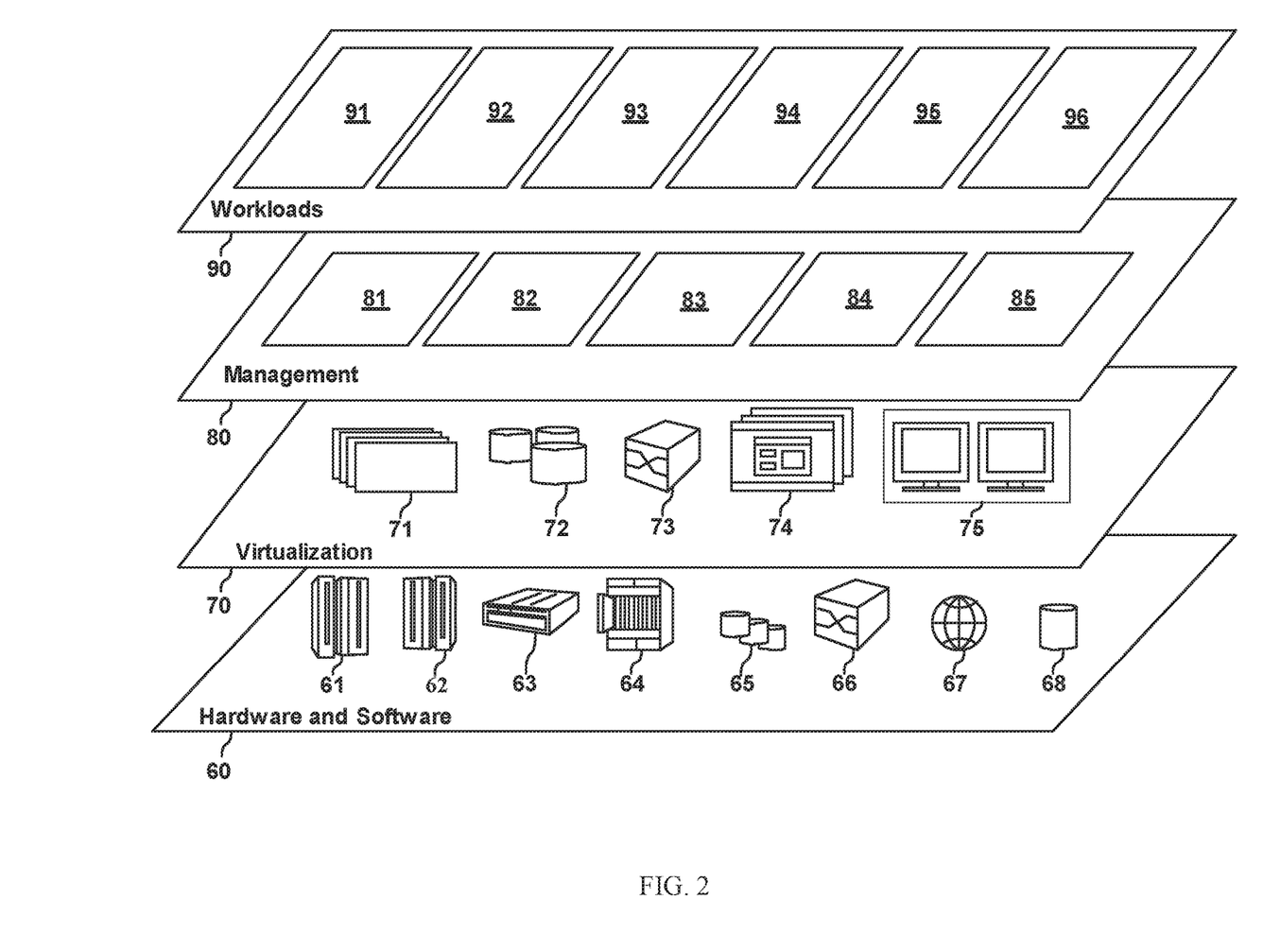
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Data Processing System in General

Figure 3:
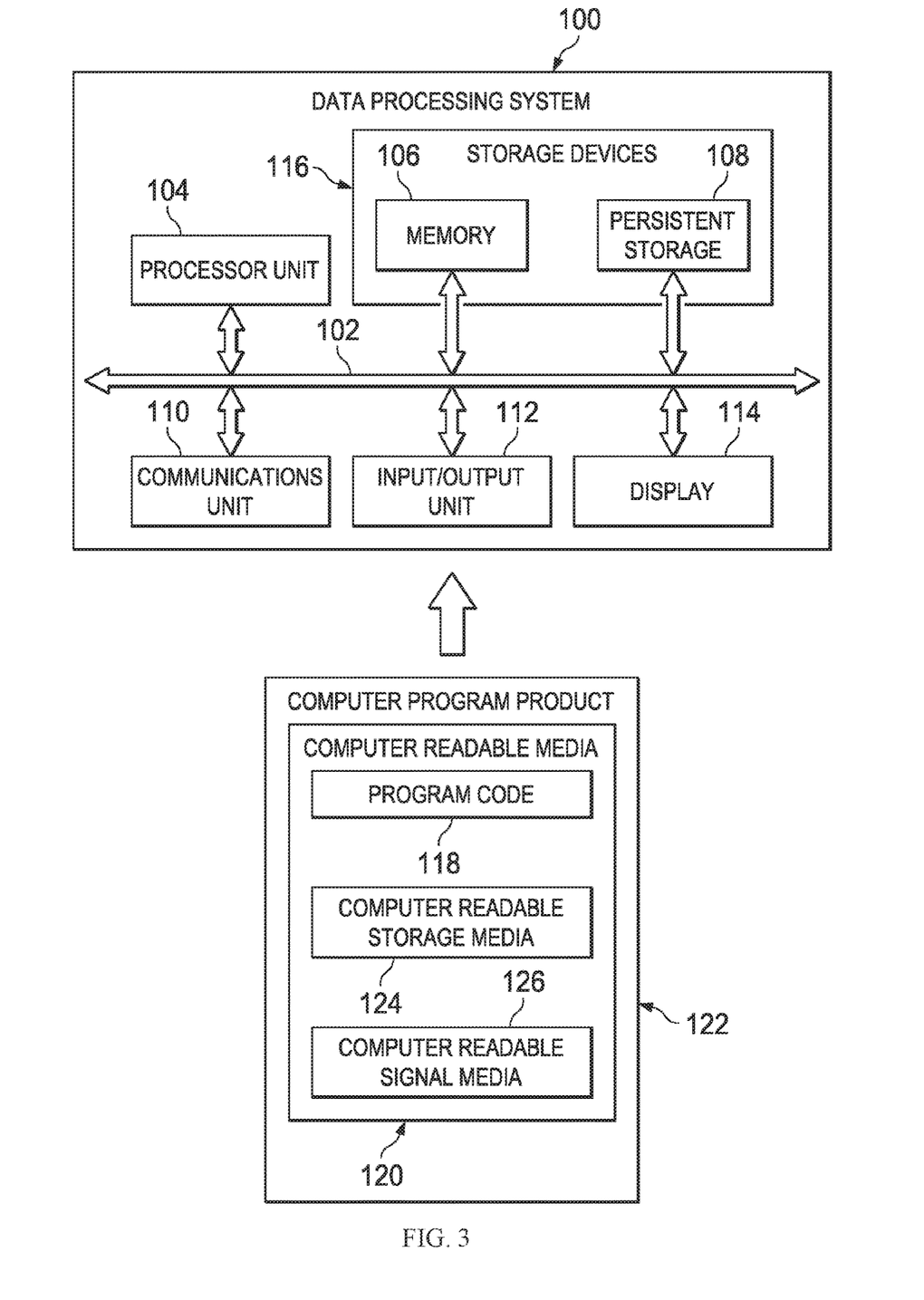
FIG. 3 is a block diagram of a DPS according to one or more embodiments disclosed herein.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/ output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Object storage (or object-based storage) is a computer data storage architecture. The storage system marks a start point (start byte) and an endpoint (end byte) of a file, along with other metadata. This is different than some traditional storage that stores data as a hierarchy (e.g., sectors, blocks, tracks, etc.). For purposes of this application, an object file is any file stored in an object storage system.

Generally, row-based data is stored in a database structure. This allows for identification and display of any set of the rows, based on a request. Storing row-based data as an object may have several advantages. For example, having only object files in an object storage system, rather than multiple file types. This may simplify initial setup and operational costs. However, database structures and object storage generally aren't compatible. Prior solutions involve adding database structures to object storage systems to manage the row-based data. This may increase the amount of hardware, software, and/or computing power needed to manage the row-based data and the object-based data simultaneously.

Embodiments of the present disclosure include a paging manager for row-based object data. The paging manager may convert and/or translate the row-based data stored as an object to a row-based structure compatible with the requesting application. In some embodiments, the paging manager generates an index based on the object file. This may be completed within the object storage system and/or the paging manager, thereby eliminating the need for a database structure within the computing environment.

Embodiments of the present disclosure generate an index for an object file containing row-based data. In some embodiments, a client sends a read request for the row-based data to the storage system. The paging manager may guess the amount of data needed, then retrieve and parse the data. If the amount of data does not capture all the requested data, another guess is made. The parsed data may be stored as an index indicating a starting byte and an end byte for each row. Thus, the amount of data necessary to fulfill the request is transferred back to the client/requestor is reduced over conventional approaches.

Embodiments of the present disclosure can return row-based object data to a requestor. In response to receiving a request, the paging manager may determine if there is an index for the file and if the index is valid. If the index has not been previously generated or is invalid (e.g., doesn't reflect the current file), then the paging manager can generate the index as described above. The appropriate data may then be returned to fulfill the request.

Embodiments of the present disclosure may reduce the amount of bandwidth needed to complete a request for data. They may also reduce computing resources to render the data by sending only what is requested. Embodiments of the present disclosure may also eliminate the need to introduce database architectures into object storage environments.

The aforementioned advantages are example advantages, and embodiments exist that can contain all, some, or none of the aforementioned advantages while remaining within the spirit and scope of the present disclosure.

Figure 4:
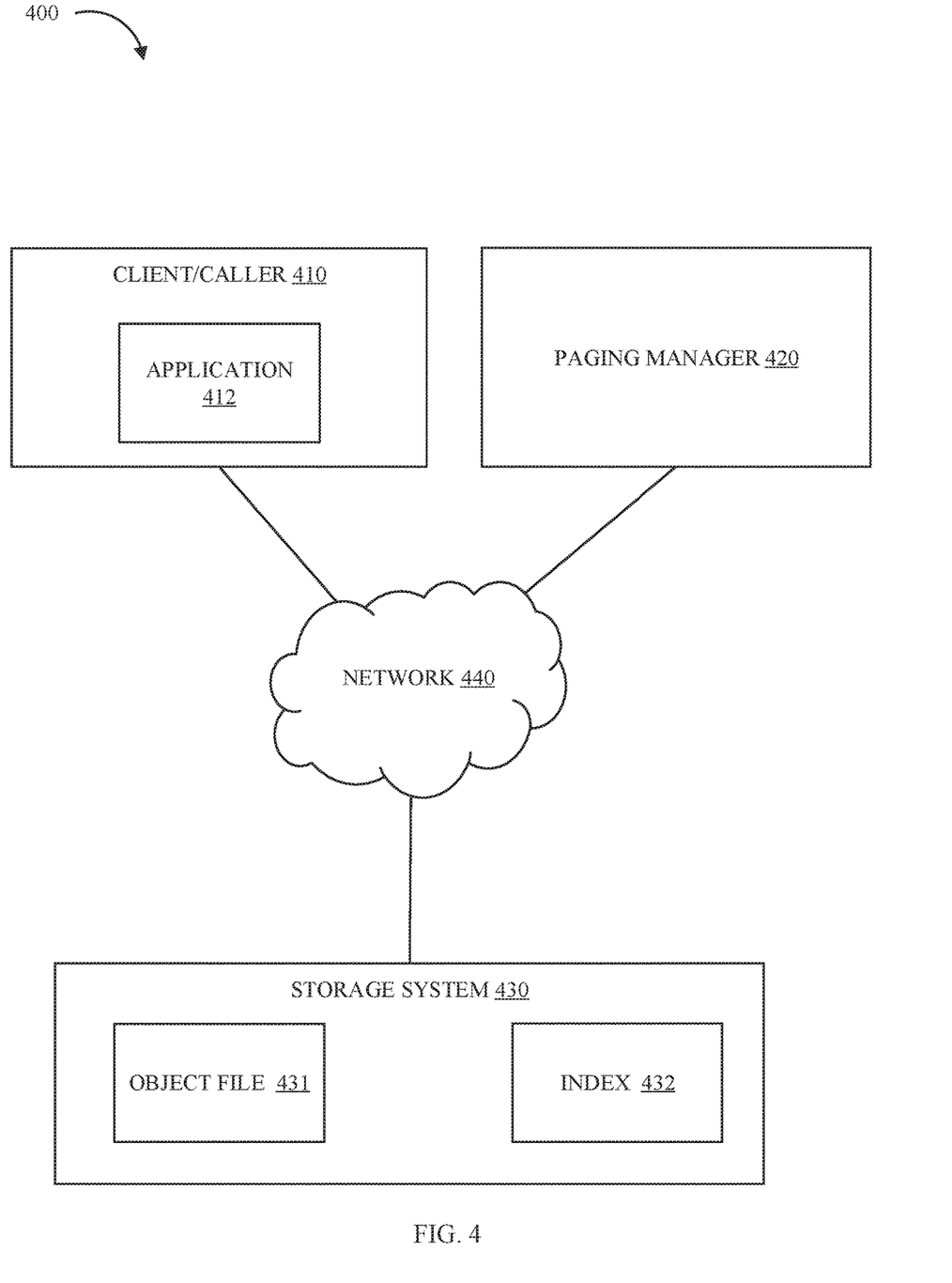
FIG. 4 illustrates a functional diagram of a computing environment suitable for operation of paging manager, in accordance with some embodiments of the present disclosure.

Referring now to various embodiments of the disclosure in more detail, FIG. 4 is a representation of a computing environment 400 that is capable of running a paging manager in accordance with one or more embodiments of the present disclosure. Many modifications to the depicted environment may be made by those skilled in the art without departing from the scope of the disclosure.

Computing environment 400 includes client 410, paging manager 420, storage system 430, and network 440. Network 440 can be, for example, a telecommunications network, a local area network (LAN), a wide area network (WAN), such as the Internet, or a combination of the three, and can include wired, wireless, or fiber optic connections. Network 440 may include one or more wired and/or wireless networks that are capable of receiving and transmitting data, voice, and/or video signals, including multimedia signals that include voice, data, and video information. In general, network 440 may be any combination of connections and protocols that will support communications between client 410, paging manager 420, storage system 430, and other computing devices (not shown) within computing environment 400. In some embodiments, client 410, paging manager 420, and storage system 430 may include a computer system, such as the computer system of FIG. 3.

Client 410 can be a standalone computing device, a management server, a web server, a mobile computing device, or any other electronic device or computing system capable of receiving, sending, and processing data. In some embodiments, client 410 represents a computing system utilizing clustered computers and components (e.g., database server computers, application server computers, etc.) that act as a single pool of seamless resources when accessed within computing environment 400. In some embodiments client 410 includes application 412.

Application 412 can be any combination of hardware and/or software configured to request and/or display row-based data on client 410. In some embodiments, application 412 includes two or more separate applications. In some embodiments, application 412 generates a request for a set of data stored as an object. The request may be for a subset of the object data (e.g., half of the lines of data). The request may be in any format/protocol that can communicate with paging manager 420, and/or storage system 430 across network 440.

Paging manager 420 can be a standalone computing device, a management server, a web server, a mobile computing device, or any other electronic device or computing system capable of receiving, sending, and processing data. In some embodiments, client 410 can represent a server computing system utilizing multiple computers as a server system, such as in a cloud computing environment. In some embodiments, client 410 represents a computing system utilizing clustered computers and components (e.g., database server computers, application server computers, etc.) that act as a single pool of seamless resources when accessed within computing environment 400.

In some embodiments, paging manager 420 is configured to display a portion of object file 431 on client 410. In some embodiments, paging manager 420 generates and/or updates index 432. In some embodiments, paging manager 420 may distinguish between rows in row-based data. This may include identifying breakpoints (e.g., delimiters), and other markers in the data. In some embodiments, paging manager 420 is included in storage system 430, and/or client 410. In some embodiments, paging manager 420 is a micro-service.

Storage system 430 can be any configuration of hardware and/or software configured to store and/or retrieve data. In some embodiments, storage system 430 stores data as objects. In some embodiments, storage system 430 stores row-based data. In some embodiments, storage system 430 includes object file 431, and index 432.

Object file 431 can be any set of data (e.g., file) that includes row-based data. In some embodiments, object file 431 is stored as an object. In some embodiments, the object file includes a file size, a starting byte (e.g., the first byte related to the file), an ending byte, and metadata. The metadata may include various information related to the file including, file creation date, file modification dates, modifications locations, and other similar data. In some embodiments, object file 431 can be updated. The relevant metadata may be updated each time the file is altered.

Index 432 can be a row-based interpretation of object file 431. In some embodiments, index 432 is stored in storage system 430. In some embodiments, index 432 is generated by paging manager 420 and is based on object file 431. In some embodiments, index 432 becomes invalid in response to object file 431 being updated. In some embodiments, index 432 includes a byte to row translation and/or conversion of at least a portion of object file 431. Index 432 may include a log of where each row ends based on a byte number or byte location within object file 431. If the byte location (e.g., end of row 1 is byte 25) changes after index 432 is generated, (e.g., by adding additional data (e.g., bytes) to row 1), each byte location for subsequent rows may be invalid. In some embodiments, a portion of index 432 becomes invalid in response to object file 431 being updated. For example, if byte 345 is in row 17, then index 432 would be invalid for any data beyond byte 345 and/or any data within row 17. The previous data may remain unaffected along with the associated portion of index 432.

In some embodiments, index 432 includes a subset of the data in object file 431. The subset may or may not include row 1. The size of the subset may be based on a data request. For example, if application 412 request rows 1-10, then index 432 will include row 1. If application 412 request rows 11-20, then index 432 may include the start byte for row 11, and the data for rows 11-20, but not all the data for rows 1-10. Index 432 would require enough data from rows 1-10 to ensure row 11 was being accurately represented by paging manager 420.

Figure 5:
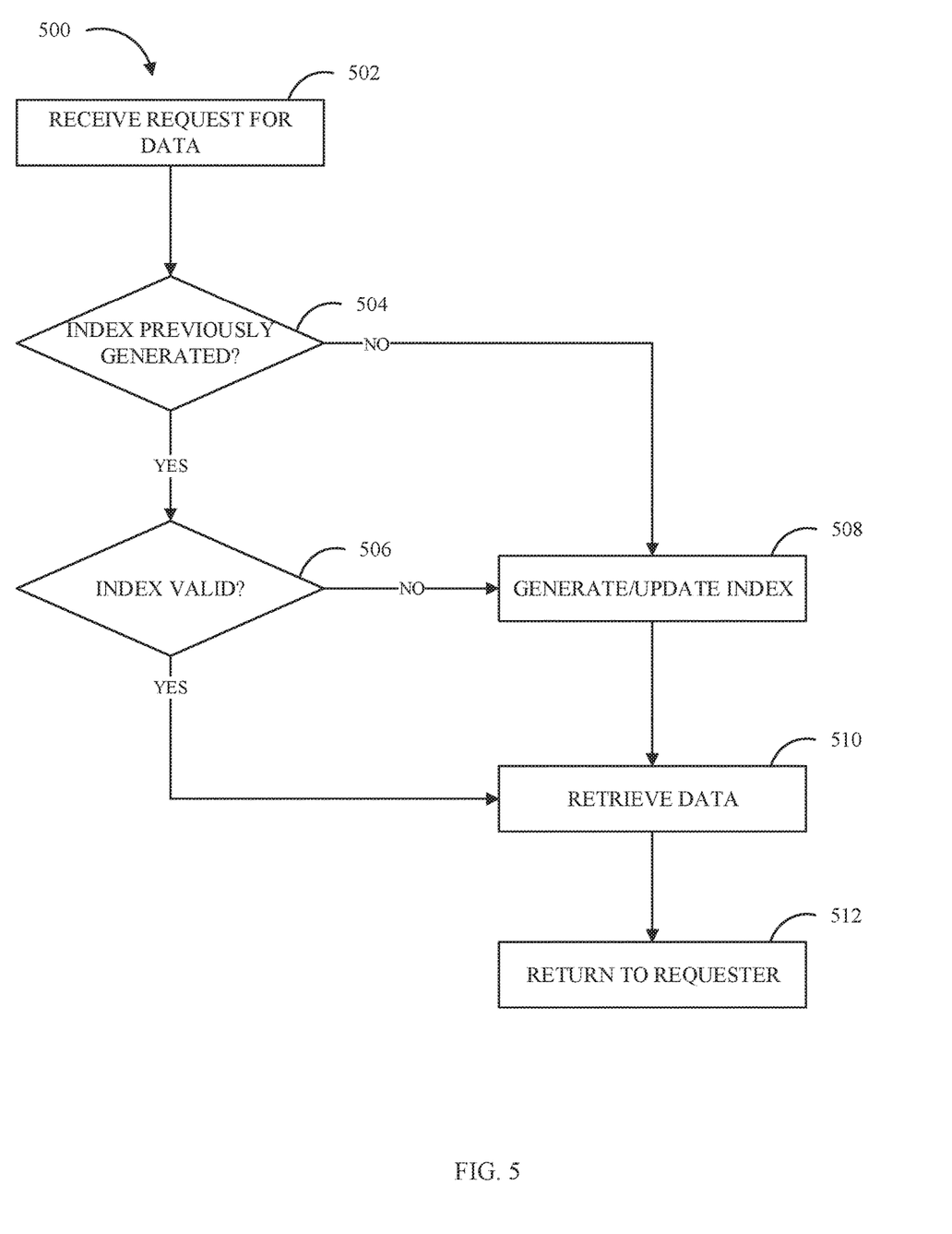
FIG. 5 illustrates a flow chart of an example method to manage paging for row-based object files, in accordance with some embodiments of the present disclosure.
Figure 6:
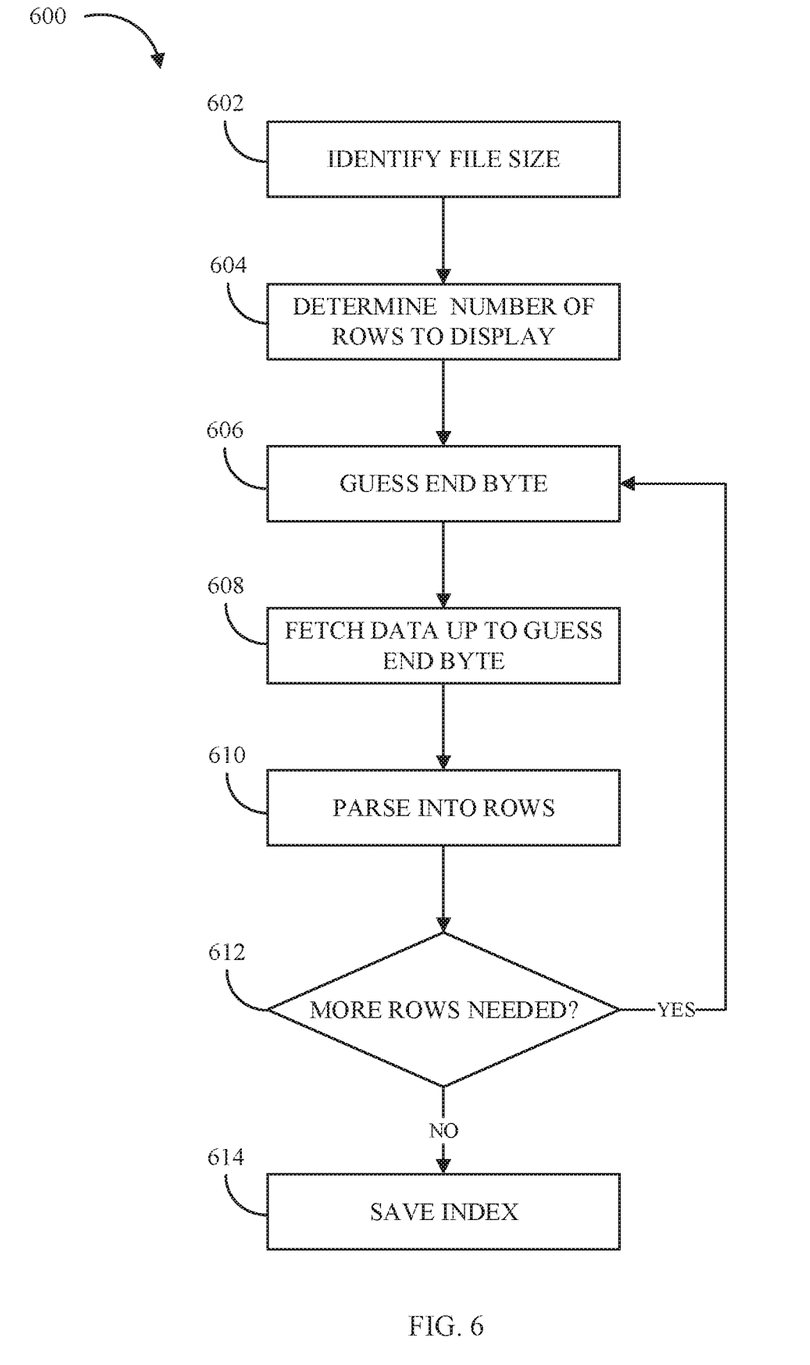
FIG. 6 illustrates a flow chart of an example method to generate and/or update an index, in accordance with some embodiments of the present disclosure.

Methods 500-600 can be implemented by one or more processors, client 410, paging manager 420, storage system 430 and/or a different combination of hardware and/or software. In various embodiments, the various operations of methods 500-600 are performed by one or more of client 410, paging manager 420, and/or storage system 430. For illustrative purposes, the method 500 will be described as being performed by paging manager 420. One or more of the advantages and improvements described above for paging row-based object data may be realized by methods 500-600, consistent with various embodiments of the present disclosure.

FIG. 5 depicts a flowchart of an example method, method 500, for paging row-based object data that can be performed in a computing environment (e.g., computing environment 400 and/or client 410).

At operation 502, paging manager 420 receives a request for data (also referred to as a "data request"). In some embodiments, the data is stored in an object file. The object file may be object file 431 of FIG. 4. Object file 431 may include row-based data (e.g., .csv (comma separated value) file, etc.).

In some embodiments, the request is received from client 410. In some embodiments, the data request is received from application 412 The data request may be configured to display a set of rows on an interface of client 410. The request may be input by a user or by another application.

At operation 504, paging manager 420 determines if an index, corresponding to the requested file, has been previously generated. In some embodiments, the determination is based on a flag and/or marker that indicates an index has been generated. In some embodiments, the index is generated if data from the file has been previously requested. If the index is not previously generated (504:NO), then paging manager 420 proceeds to operation 508. If the index is previously generated (504:YES), then paging manager 420 proceeds to operation 506.

At operation 506, paging manager 420 determines if the index is valid. A valid index indicates the index can accurately page the row-based data without updating the index. Flags and/or other metadata may be used to track changes to object file 431. The flag may indicate the location, the date, and/or the time the file was altered. In some embodiments, the index is valid if object file 431 has not changed since the previous request.

In some embodiments, the index is valid if the portion of the file needed to fulfill the request has not been altered. For example, if the last change to the file only involved adding new rows of data, all prior rows would remain unchanged. If the request was for a portion of the previously indexed rows, then the index is valid. As another example, assume a request is for lines 5-10 of the file, and row 5 starts at byte 22 and row 10 ends at byte 45 of the file. If the last change to the file was before byte 45, then the file would be invalid because the indexing beyond the changed byte is invalid. If the index is not valid (506:NO), then paging manager 420 proceeds to operation 508. If the index is valid (506:YES), then paging manager 420 proceeds to operation 510.

At operation 508, paging manager 420 generates and/or updates the index. In some embodiments, the index is generated in response to the index not being previously generated. In some embodiments, the index is updated in response to the index being invalid. Generating and/or updating the index will be discussed in further detail in relation to FIG. 6.

At operation 510, paging manager 420 retrieves the requested data. In some embodiments, the data is retrieved from the index. For each row, the index may contain one or more of a first file byte, a last file byte, a file size, a row start byte, and a row end byte. In some embodiments, operation 510 includes returning/sending the requested data to the requestor.

In some embodiments, operation 510 includes paging the data stored in the index. The request may include how many rows may be displayed at a single time based on the parameters of client 410. For example, a request may include rows 1-75. The interface of client 410 may only display 15 rows at a time. The index would be valid for rows 1-75. Only a portion of the 75 rows may be displayed at a time. Because each row's start byte and end byte are mapped in the index, only relevant data will be transferred. This may reduce bandwidth use and/or limit computing resources needed. Method 500 may prevent sending the entire file to the requestor.

FIG. 6 depicts a flowchart of an example method, method 600, for generating/updating an index for paging object data that can be performed in a computing environment (e.g., computing environment 400).

At operation 602, paging manager 420 identifies the file size. In some embodiments, the file size is received from storage system 430. The file size may include the total number of bytes that contain file data. In some embodiments, the first bytes in the file are numbered sequentially. For example, the first byte may be byte 0, the second byte 1, and so on.

At operation 604, paging manager 420 determines the number of rows to display. In some embodiments, the number of rows to display is received with the request. This may vary based on the configurations of client 410, application 412, and/or other similar parameters. For example, application 412 may currently be configured to show 15 rows of data. In some embodiments, determining the rows needed may be based on current/previously retrieved data. For example, assume a previous request is completed and rows 1-15 are being displayed, the maximum that may be displayed. A new request is received for rows 10-25. Rows 10-15 will have been previously indexed, so 10 additional rows need to be indexed. In some embodiments, the number of rows to index is based on the number or rows that may be displayed.

At operation 606, paging manager 420 selects a guess end byte. The guess is configured to select the amount of data needed to index the rows to display. The guess may be based on previous guesses. If a previous guess was too short, then a subsequent guess may include more data, and vice versa. In some embodiments, the guess is based on the number of byes in a previously indexed row (or the $1^{st}$ row). For example, if a request is for rows 11-20, and row 10 has 8 bytes, the guess end byte may be 80 bytes (ten rows multiplied by eight bytes each). There may also be a factor to increase or decrease the guess. As another example, assume a request is for rows 1-15. A previous guess of byte 50, included rows 1-5. The next guess may be the end byte of row 5 plus 100 bytes. This is because 50 bytes returned 5 rows, and 10 more rows are needed.

In some situations, the number of rows in the file may be less than the number of rows to display. In this case the guess may be the end byte of the file, or said differently, all the data may be retrieved.

At operation 608, paging manager 420 fetches the data up to the guess end byte, which, in some embodiments, is fetched from object file 431.

At operation 610, paging manager 420 parses the fetched data into rows. In some embodiments, the data is parsed by identifying each record delimiter. A record delimiter is a piece of data that indicates a new row. In some embodiments, the parsing includes identifying the byte number (or location) of each record delimited. For example, row 1 bytes 0-5, row 2 bytes 6-12, etc. Each row does not necessarily include the same number of bytes.

At operation 612, paging manager 420 determines if more rows are needed. In some embodiments, more rows are needed if the final parsed row is less than the number of requested rows. In some embodiments, more rows are not needed if the number of parsed (or completed) rows in the index is equal to or greater than the number of rows requested. If more rows are needed to complete the request (612:YES), then paging manager 420 returns to operation 606. If no more rows are needed to complete the request (612:NO), then paging manager 420 proceeds to operation 614. At operation 614, paging manager 420 saves the parsed row data in the index.

If a subsequent request is received, the index contains the number of bytes for each row. If a new request is for rows 1-5, only the data necessary for client 410 to accurately display rows 1-5 is sent. This may save bandwidth when transferring data between client 410, paging manager 420, and/or storage system 430. It may also reduce computing resources needed to render the data on client 410. Now the client only has to process the data for rows 1-5 and not any excess data.

Computer Technology and Computer Readable Media

The one or more embodiments disclosed herein accordingly provide an improvement to computer technology. For example, an improvement to a search engine allows for a more efficient and effective search for information by the user. The ability to access stored information with which the user has interacted with in some manner, and allowing the weighting of the importance of this information to decay over time beneficially improves the operation of the search and benefits the user in that more pertinent results may be presented to the user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   receiving, from a client, a request for a set of data, wherein the set of data is included in a file, the file is stored as an object file, and the file is stored in an object based storage system, wherein the object based storage system is a non-hierarchical data architecture that stores the file with a marked start byte and a marked end byte of the file, and the file includes row based data for a plurality of rows;
   generating, by a micro-service, an index of the file, wherein the index file includes a byte to row translation of a portion of the file;
   storing the index in the object based storage system;
   retrieving, from the index, the set of data;
   returning, to the client, the set of data;
   receiving, from the client, a third request for a third set of data from the file;
   determining, the file has been altered after returning the set of data;
   identifying, a changed byte number in the file;
   determining, based on the changed byte number, an altered row in the index;
   deleting, from the index, the altered row and each subsequent row;
   updating the index to reflect the altered file;
   retrieving, from the updated index, the third set of data; and
   returning, to the client, the third set of data.

2. The method of claim 1, wherein generating the index further comprises:
   selecting a number of bytes, wherein the number of bytes is a guess configured to include the set of data;
   fetching the selected number of bytes from the file;
   identifying a first set of one or more rows included in the number of bytes; and
   storing the first set of one or more rows in the index.

3. The method of claim 2, wherein identifying the first set of one or more rows included in the number of bytes comprises:
   parsing the selected number of bytes, wherein each row of the first set one or more rows includes a row number, a row start byte, and a row end byte, and each row is separated by a record delimiter.

4. The method of claim 2, further comprising
   determining a number of rows included in the request;
   identifying a last row number of the first set of one or more rows, wherein the last row number is a last complete row of the first set of one or more rows; and
   in response to the last row number being less than the number of rows included in the request, selecting a second number of bytes, fetching the second number bytes from the file, identifying a second set of one or more rows included in the second number of bytes, and storing the second set of one or more rows in the index.

5. The method of claim 4, wherein the second number of bytes is different than the selected number of bytes, and the second number of bytes is based on the first set of one or more rows and the number of rows included in the request.

6. The method of claim 4, further comprising:
   repeating, selecting a next number of bytes, fetching a next number of bytes from the file, identifying a next set one or more rows included in the next number of bytes, and storing the next set of one or more rows in the index, until a total number of rows in the index is at least equal to the number of rows included in the request.

7. The method of claim 2, further comprising:
identifying a size of the file;
determining the number of bytes is greater than the file size; and
changing the number of bytes to equal the file size.

8. The method of claim 1, further comprising:
receiving, from the client, a second request for a second set of data from the file;
determining, the index is valid; and
retrieving, in response to the index being valid, the second set of data from the index; and
returning, to the client, the second set of data.

9. The method of claim 8, wherein the second set of data is included in the set of data.

10. The method of claim 8, further comprising:
determining a new set of rows corresponding to the second set of data are included in the index.

11. The method of claim 8, wherein the index is valid if the file is the same at a time of the request for the set of data, and at a second time of the second request for the second set of data.

12. The method of claim 1 wherein the method is performed by a paging manager, executing program instructions, and wherein the program instructions are downloaded from a remote data processing system.

13. A system comprising:
a processor; and
a computer-readable storage medium communicatively coupled to the processor and storing program instructions which, when executed by the processor, are configured to cause the processor to:
receive, from a client, a request for a set of data, wherein the set of data is included in a file, the file is stored as an object file, and the object file is stored in an object based storage system, wherein the object based storage system is a non-hierarchical data architecture that stores the file with a marked start byte and a marked end byte of the file, and the file includes row based data for a plurality of rows;
generate, by a micro-service, an index of the file, wherein the index file includes a byte to row translation of a portion of the file;
store the index in the object based storage system;
retrieve, from the index, the set of data;
return, to the client, the set of data
receive, from the client, a third request for a third set of data from the file;
determine, the file has been altered after returning the set of data;
identify, a changed byte number in the file;
determine, based on the changed byte number, an altered row in the index;
delete, from the index, the altered row and each subsequent row;
update the index to reflect the altered file;
retrieve, from the updated index, the third set of data; and
return, to the client, the third set of data.

14. The system of claim 13, wherein the program instructions are further configured to cause the processor to:
select a number of bytes wherein the number of bytes is a guess configured to include the set of data;
fetch the selected number of bytes from the file;
identify a first set of one or more rows included in the number of bytes; and
store the first set of one or more rows in the index.

15. The system of claim 14, wherein the program instructions are further configured to cause the processor to:
determine a number of rows included in the request;
identify a last row number of the first set of one or more rows, wherein the last row number is a last complete row of the first set of one or more rows; and
in response to the last row number being less than the number of rows included in the request, select a second number of bytes, fetching the second number bytes from the file, identifying a second set of one or more rows included in the second number of bytes, and storing the second set of one or more rows in the index.

16. The system of claim 15 wherein the second number of bytes is different than the selected number of bytes, and the second number of bytes is based on the first set of one or more rows and the number of rows included in the request.

17. A computer program product, the computer program product comprising a computer readable storage medium having program instructions embodied therewith, the program instructions executable by a processing unit to cause the processing unit to:
receive, from a client, a request for a set of data, wherein the set of data is included in a file, the file is stored as an object file, and the object file is stored in an object based storage system and the file includes row based data for a plurality of rows;
generate, by a micro-service, an index of the file, wherein the index file includes a byte to row translation of a portion of the file;
store the index in the object based storage system;
retrieve, from the index, the set of data;
return, to the client, the set of data;
receive, from the client, a third request for a third set of data from the file;
determine, the file has been altered after returning the set of data;
identify, a changed byte number in the file;
determine, based on the changed byte number, an altered row in the index;
delete, from the index, the altered row and each subsequent row;
update the index to reflect the altered file;
retrieve, from the updated index, the third set of data; and
return, to the client, the third set of data.

18. The computer program product of claim 17, wherein the program instructions are further configured to cause the processing unit to:
select a number of bytes;
fetch the selected number of bytes from the file;
identify a first set of one or more rows included in the number of bytes; and
store the first set of one or more rows in the index.

19. The computer program product of claim 18, wherein the program instructions are further configured to cause the processing unit to:
determine a number of rows included in the request;
identify a last row number of the first set of one or more rows, wherein the last row number is a last complete row of the first set of one or more rows; and
in response to the last row number being less than the number of rows included in the request, select a second number of bytes, fetching the second number bytes from the file, identifying a second set of one or more rows included in the second number of bytes, and storing the second set of one or more rows in the index; and wherein the second number of bytes is different than the selected number of bytes, and the second number of bytes is based on the first set of one or more rows and the number of rows included in the request.

* * * * *